United States Patent
Nagase

(10) Patent No.: US 6,725,179 B1
(45) Date of Patent: Apr. 20, 2004

(54) MONITORING SYSTEM WITH POWER SUPPLY BUILT THEREIN

(75) Inventor: Mamoru Nagase, Kakogawa (JP)

(73) Assignee: TLV Company Limited, Hyogo-ken (JP)

( * ) Notice: Subject to any disclaimer, the term of this patent is extended or adjusted under 35 U.S.C. 154(b) by 0 days.

(21) Appl. No.: 09/417,517

(22) Filed: Oct. 14, 1999

(30) Foreign Application Priority Data

Oct. 15, 1998 (JP) .......................................... 10-293634

(51) Int. Cl.$^7$ ............................................... G06F 11/00
(52) U.S. Cl. ........................................ 702/188; 73/705
(58) Field of Search ........................... 702/57, 58, 59, 702/60, 182, 188; 73/592, 705, 146; 60/277; 600/587; 477/98; 379/106.06

(56) References Cited

U.S. PATENT DOCUMENTS

| | | | |
|---|---|---|---|
| 4,256,258 A | 3/1981 | Sekiya | 236/94 |
| 4,258,565 A | 3/1981 | Sawayama et al. | 73/369 |
| 4,397,188 A | 8/1983 | Bansevichus et al. | 73/651 |
| 4,455,453 A * | 6/1984 | Parasekvakos et al. | 379/106.06 |
| 4,705,212 A * | 11/1987 | Miller et al. | 236/54 |
| 4,712,602 A | 12/1987 | Kaiser et al. | 164/453 |
| 4,756,030 A | 7/1988 | Juliver | 4/668 |
| 4,963,375 A | 10/1990 | Sato et al. | 426/233 |
| 4,966,031 A | 10/1990 | Mochizuki | 73/35.11 |
| 5,184,642 A | 2/1993 | Powell | 137/607 |
| 5,301,553 A * | 4/1994 | Schultz et al. | 73/705 |
| 5,329,465 A | 7/1994 | Arcella et al. | 417/133 |
| 5,401,142 A | 3/1995 | Yumoto | 417/132 |
| 5,445,501 A | 8/1995 | Yumoto | 417/133 |
| 5,579,823 A | 12/1996 | Mikol et al. | 164/98 |
| 5,586,066 A * | 12/1996 | White et al. | 702/181 |
| 5,655,888 A | 8/1997 | Yumoto | 417/132 |
| 5,738,498 A | 4/1998 | Allington et al. | 417/53 |
| 5,755,560 A | 5/1998 | Yumoto | 417/133 |
| 5,765,369 A * | 6/1998 | Tanaka et al. | 60/277 |
| 5,796,006 A | 8/1998 | Bellet et al. | 73/661 |
| 5,811,001 A | 9/1998 | Chang | 210/238 |
| 5,830,106 A * | 11/1998 | Abe | 477/98 |
| 5,845,844 A | 12/1998 | Zosimodis | 236/12.12 |
| 5,892,690 A * | 4/1999 | Boatman et al. | 700/276 |
| 5,911,694 A * | 6/1999 | Ikeda et al. | 600/587 |
| 5,918,354 A | 7/1999 | Ikegami et al. | 29/25.35 |
| 6,017,143 A * | 1/2000 | Eryurek et al. | 700/51 |
| 6,026,352 A * | 2/2000 | Burns et al. | 702/182 |
| 6,126,373 A | 10/2000 | Yee et al. | 414/5 |
| 6,189,384 B1 * | 2/2001 | Piety et al. | 73/592 |
| 6,208,253 B1 | 3/2001 | Fletcher et al. | 340/584 |

FOREIGN PATENT DOCUMENTS

WO     WO 97 18359     5/1997

* cited by examiner

*Primary Examiner*—Marc S. Hoff
*Assistant Examiner*—Mohamed Charioui
(74) *Attorney, Agent, or Firm*—Kenyon & Kenyon

(57) ABSTRACT

A monitoring system with a power supply built therein, which is capable of setting installation expenses at low cost and obtaining a stable result of monitoring for a predetermined period. The monitoring system comprises a sensor unit having sensors and a power supply incorporated therein, and a portable data logger having a communication module and a power supply built therein. Physical quantities such as vibrations, temperatures, and pressure, of an object to be monitored are detected by the sensors, followed by transmission to the portable data logger, whereby the state of operation of the object is displayed.

9 Claims, 5 Drawing Sheets

MONITORING SYSTEM WITH POWER SUPPLY BUILT THEREIN

FIELD OF THE INVENTION

The present invention relates to a monitoring system for maintaining and inspecting valves attached to various pipe arrangements, traps such as a steam trap and a gas trap, or various facilities installed in various factories, such valves including a pressure reducing valve, a safety valve, an automatic control valve, and a directional control check valve. The present invention relates particularly to a monitoring system with a built-in power supply, which is capable of reducing expenses used to install the monitoring system and obtaining a stable output result of monitoring.

BACKGROUND INFORMATION

Plant facilities such as various rotating machines and driving machines, and valves for controlling the flows of various fluids have been mounted in large numbers on production sites in various factories. These facilities and valves have been constantly or periodically inspected and monitored for their operating conditions according to the degree of their importance in order to obtain the maximum volume of production with the minimum energy of consumption and maintain the maximum quality of production.

As the conventional monitoring system, one has generally been used which senses physical quantities such as temperatures, pressure, and vibrations to be monitored, compares each sensed value with a predetermined reference value, and observes a change in each sensed value with time, thereby making a decision or determination as to whether an object to be monitored normally operates or is brought into a possibility that the object will lead to a failure in near future.

In the conventional monitoring system, a commercial source used through a general electrical wire or line, a photocell, that is, a solar battery, or a thermal power-generating element or device, etc. have been used as driving sources for a sensor unit, an arithmetic display unit, etc.

The monitoring system using the commercial source of the conventional driving sources is accompanied by a problem in that the electrical wire is made long in distance and becomes complex, thereby increasing its cost, a problem in that the photocell cannot obtain a sufficient electromotive force at night or indoors and the electromotive force is reduced with smudges of the surface of a light-receiving panel, or a problem in that the thermal power-generating device cannot obtain a stable electromotive force at all times.

SUMMARY OF THE INVENTION

It is therefore an object of the present invention to provide an advanced monitoring system capable of providing less installation expenses and obtaining a stable output result of monitoring for a predetermined period to thereby make it possible to reliably confirm operating conditions of various facilities and valves.

According to one aspect of the present invention, there is provided a monitoring system, comprising a sensor unit for sensing one or plural of physical quantities such as temperatures, pressure, and vibrations, which are objects to be monitored, an arithmetic display unit for making a decision or determination, based on the value sensed by the sensor unit, as to whether an object to be monitored normally operates or is brought into a possibility that the object will lead to a failure in near future, and a driving power supply incorporated in at least one of the sensor unit, the arithmetic display unit and a coupling portion for coupling the sensor unit and the arithmetic display unit to each other by wire or radio. Thus, a power supply is incorporated into a point where an electrical wire is maximized in length and becomes complex, to thereby omit the electrical wire, and a power supply is built in a point where a stablest drive source is required, whereby installation expenses can be reduced and a predetermined stable result of monitoring can be obtained.

DETAILED DESCRIPTION

Figure 1:
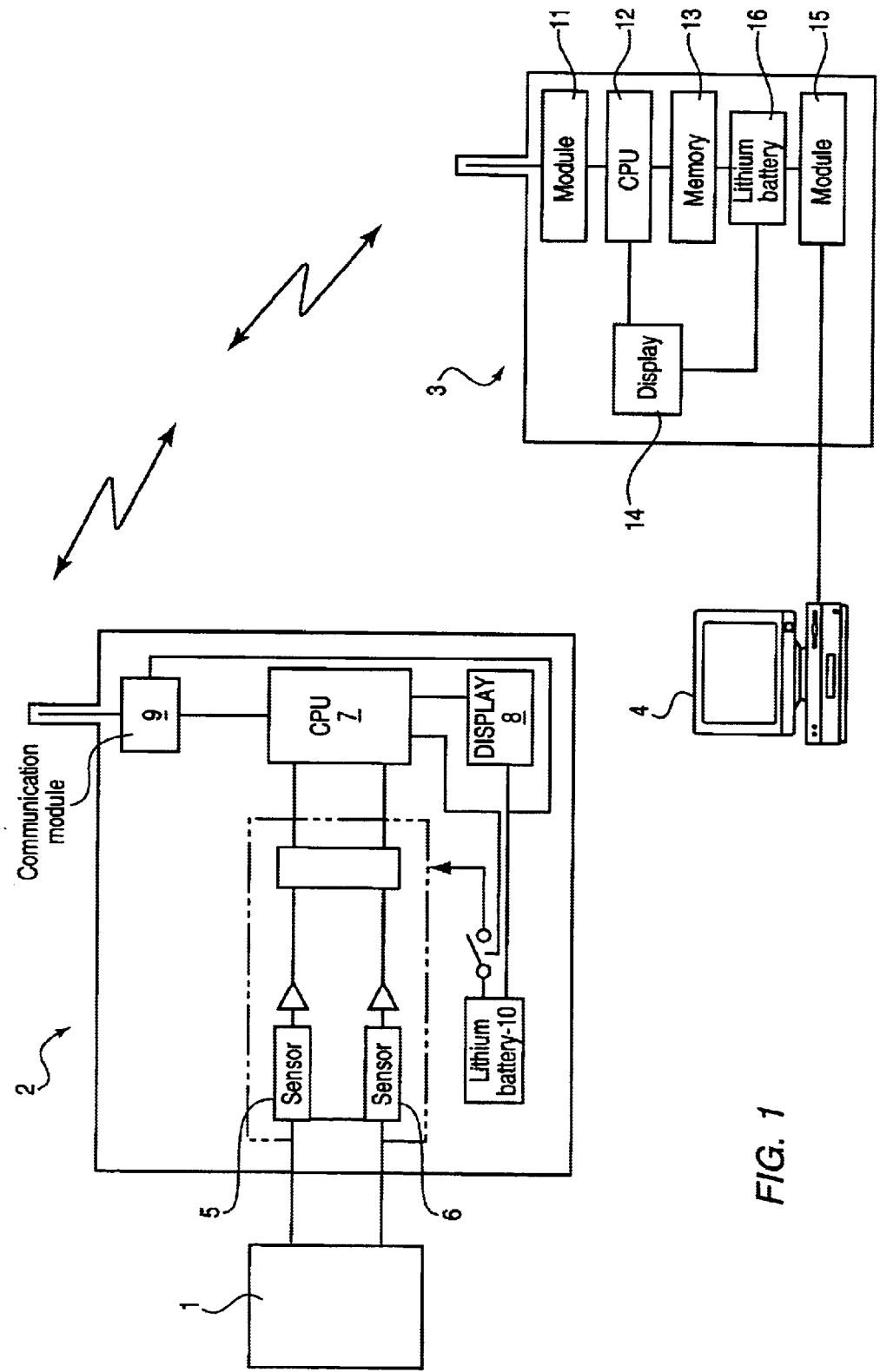
FIG. 1 is a block diagram showing a first embodiment of a monitoring system with a built-in power supply, according to the present invention.

FIG. 1 shows a monitoring system wherein a sensor unit 2 is directly attached to a valve, a trap 1 or the like to be monitored, monitoring information is collected by a remote portable data logger 3, and the detailed analysis, arithmetic operation and display or storage or the like of data are performed by a computer 4.

A method of mounting the sensor unit 2 to the trap 1 is capable of joining both to each other with a fastener such as screws or the like or detachably mounting them to each other through a joint. When the sensor unit 2 cannot be directly mounted to an object to be monitored, the sensor unit 2 may be placed in the vicinity of the object through a transfer member corresponding to a physical quantity as an object. Alternatively, the sensor unit 2 may of course be incorporated and placed inside the object 1 to be monitored such as the valve, trap or the like.

The sensor unit 2 shown in FIG. 1 comprises sensors 5 and 6 capable of detecting physical quantities such as pressure, temperatures, vibrations, etc., a CPU 7 for computing values detected by the sensors 5 and 6 and comparing them with a reference value, a display 8 for displaying the result of computation by the CPU 7, a communication module 9 for sending the result of computation by the CPU 7 to the portable data logger 3, and a lithium battery 10 used as a source or power supply for driving the entire sensor unit 2.

The sensor unit 2 is capable of displaying the result of computation by the CPU 7, based on the values detected by the sensors 5 and 6 and confirming the state of operation of the object 1 to be monitored on the spot. Further, the sensor unit 2 is capable of sending the result of computation to the remote portable data logger 3 through the communication module 9. When it is not necessary to cause the sensor unit 2 to display the state of operation thereof, the sensor unit 2 is also allowed to have the function of communicating with the data logger 3. Although not illustrated in the drawing, a limiter for sending a signal when the upper limits or lower limits of the values detected by the sensors 5 and 6 exceed a predetermined set value, is incorporated into the sensor unit 2. Similarly, a storage unit such as a RAM, a ROM or the like is provided within the sensor unit 2 to store therein an ID number as an identification code for the valve or the trap 1 to be monitored.

The present embodiment shows an example in which information can be bidirectionally transferred between the sensor unit 2 and the portable data logger 3 by radio. Radio communications include optical communications using infrared rays or the like, ultrasonic communications or communications using commonly-used radio waves.

The portable data logger 3 comprises a module 11 which communicates with the sensor unit 2, a CPU 12, a memory 13, a display 14, a module 15 which communicates with the computer 4, and a lithium battery 16 used as a source or power supply for driving these. The portable data logger 3 is capable of collecting monitored data obtained from a plurality of valves or traps 1 used as monitoring objects at arbitrary positions away from the objects and displaying them thereon. Alternatively, the portable data logger 3 sends the data to the computer 4 to allow various detailed analyses and arithmetic operations thereof, etc. When it is unnecessary to cause the data logger 3 to display the state of operation, the data logger 3 is allowed to have the function of communicating with the computer 4 and the computer 4 may display the state of operation.

Physical quantities such as temperatures, vibrations, conductance, etc. which indicate state quantities of the valves and the traps 1 to be monitored, are detected by the sensors 5 and 6 and sent to the portable data logger 3 through the communication module 9 together with the ID numbers corresponding to the identification codes of each individual valve or steam trap 1, which have been stored in a storage unit, where monitoring data indicative of the states of operations of the objects to be monitored such as the large number of valves and traps 1 or the like are collected, followed by transmission to the computer 4, where their analyses and arithmetic operations are performed in further details. As a result, monitoring to be effected on the objects to be monitored is executed at all times or with the frequency corresponding to the degree of importance of the objects to be monitored. In the present embodiment, the communication module 9 of the sensor unit 2 and the communication module 11 of the portable data logger 3 constitute a coupling portion.

In order to reduce the consumption of power by the sensor unit 2 and increase the life of the built-in battery, an analog circuit system lying within the sensor unit 2 is normally kept deactivated and the communication module 9 is kept in a received waiting state. Further, the analog circuit system lying within the sensor unit 2 is kept in communication upon only reception of a command from the portable data logger 3. Under such a condition, the values detected by the sensors 5 and 6 can be displayed or transmitted.

Another method of reducing the consumption of power by the sensor unit 2 is as follows: An unillustrated timer lying within the CPU 7 is utilized and only the timer is normally driven. Only when the timer passes beyond a set time, the sensor unit 2 is energized to perform sensing, and the result of sensing is stored in a memory or it is sent to the data logger 3 at the time of the sensing, whereby the power consumption can be reduced.

A so-called primary battery such as an alkaline battery, a mercury battery or a lithium battery is suitable for a source or power supply. Described specifically, a lithium battery such as a thionyl chloride lithium battery may desirably be used. Assuming that when the present thionyl chloride lithium battery is used, the power per day, which is consumed or used up by each of the sensor unit, the arithmetic display unit and the coupling portion, for example, is about 250 mW, the battery is able to continue using without its replacement for about seven years.

A battery may be utilized in combination with a solar battery, a thermal power-generating element or device or the like as the power supply at a point having a possibility of smudges being less outdoors or a point where a predetermined quantity of heat is steadily generated.

Figure 2:
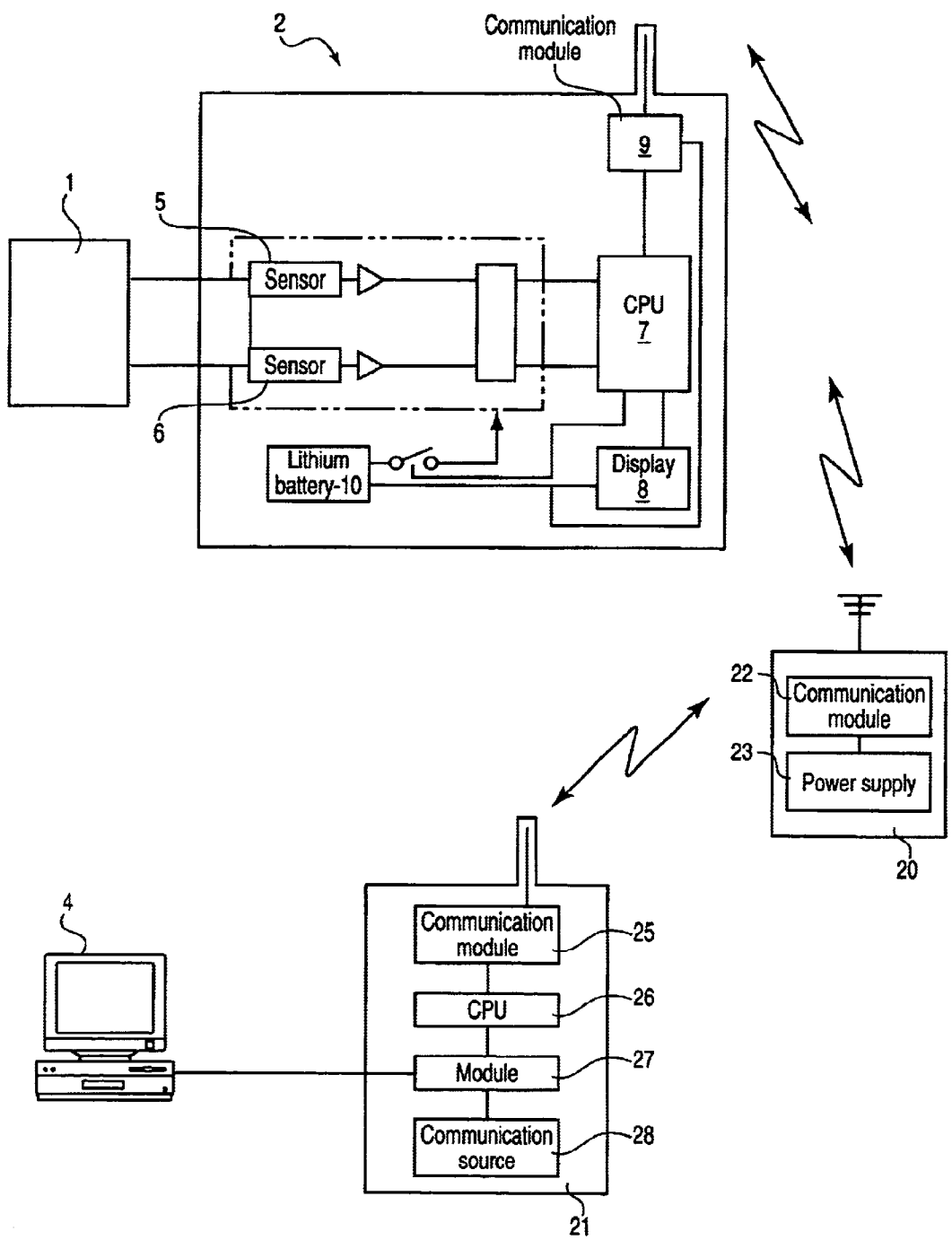
FIG. 2 is a block diagram illustrating a second embodiment of a monitoring system with a built-in power supply, according to the present invention.

A second embodiment is illustrated in FIG. 2. In FIG. 2, a monitoring system comprises a sensor unit 2 similar to that employed in the embodiment shown in FIG. 1, a repeater 20 for communications, a data logger 21 for receiving a signal sent from the repeater 20, and a computer 4.

A communication module 22 and a source or power supply 23 are incorporated into the repeater 20. A primary battery such as a lithium battery or the like or a combination of a solar battery or a thermal power-generating device and a battery may be used as the power supply 23.

The data logger 21 comprises a communication module 25, a CPU 26, a module 27 which communicates with the computer 4, and a general commercial source 28. In the present embodiment, a communication module 9 of the sensor unit 2, the communication module 22 of the repeater 20, and the communication module 25 of the data logger 21 constitute a coupling portion.

A physical quantity of an object 1 to be monitored, which has been detected by the sensor unit 2, is transmitted and received by the data logger 21 through the repeater 20, followed by transmission to the computer 4 through a commonly-used wire connection or infrared interface. These information transfers are not necessarily limited to one direction. The signal can be bidirectionally transferred among them. In the present embodiment, the placement of the repeater 20 in a predetermined point makes it possible to take a system for fixedly placing the data logger 21 in a predetermined position.

While the present embodiment shows an example in which the power supplies for the sensor unit 2 and the portable data logger 3 are used as the built-in batteries, the built-in battery may be used only for the sensor unit 2 or the built-in battery may be used only for the portable data logger 3. The portable data logger 3 is normally carried by maintenance and inspection personnel upon working. Since the portable data logger 3 can be charged before its carrying, a rechargeable battery may be used in place of the built-in battery.

Figure 3:
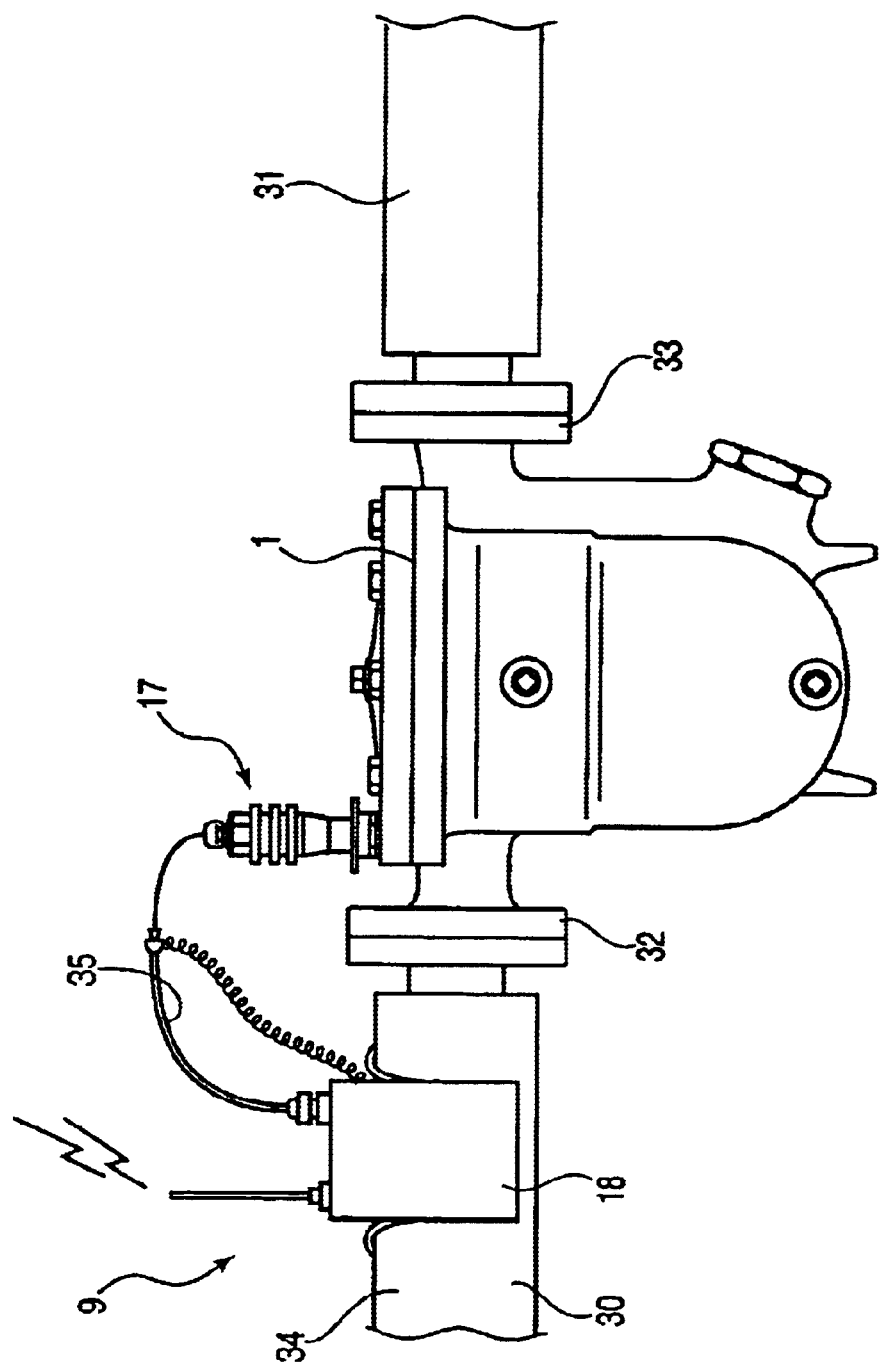
FIG. 3 is a block diagram depicting an embodiment of a steam trap-oriented monitoring system with a built-in power supply, according to the present invention.
Figure 4:
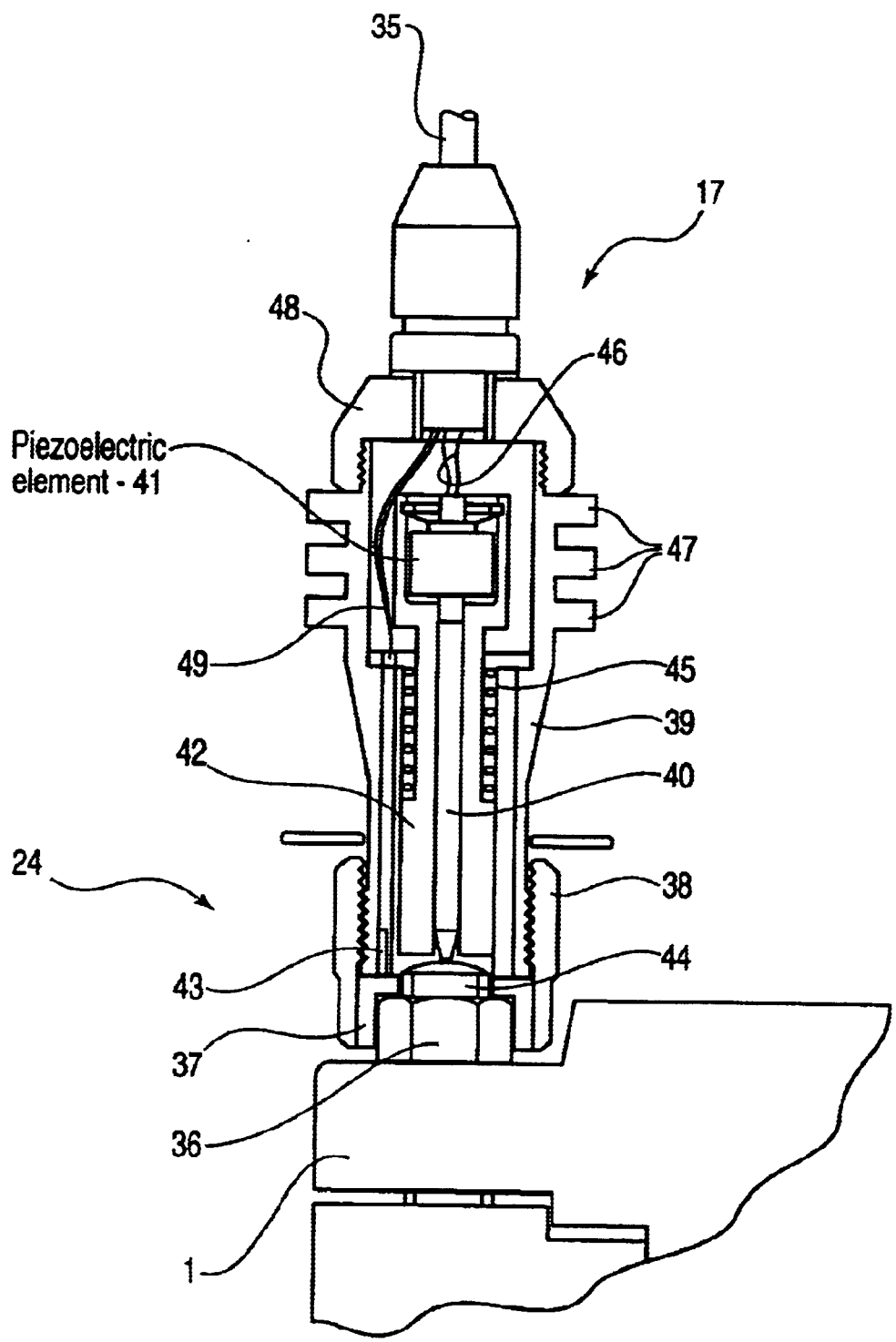
FIG. 4 is an enlarged cross-sectional view of a sensor employed in the steam trap-oriented monitoring system shown in Figure.

A monitoring system in which a steam trap 1 is intended for an object to be monitored, is next shown in FIGS. 3 and 4.

Referring to FIG. 3, the steam trap 1 is mounted between steam piping 30 on the inlet side and drain piping 31 on the outlet side with flanges 32 and 33 interposed therebetween. The steam trap 1 allows only steam introduced from the steam piping 30 and a drain in a mixed fluid, of a drain obtained as condensed water of steam to flow downward toward the drain piping 31. Where only the drain flows downward within the steam trap 1 and the steam originally prohibited from flowing downward flows downward, the values of vibrations developed when their fluids flow downward, differ from each other and the values of temperatures on the external surface of the steam trap are also different from each other. The monitoring system performs sensing on the values of these vibrations and temperatures through the use of a sensor 17 and monitors whether the steam trap 1 is properly operated.

In the present embodiment, the sensor 17 and a transmitter 18 are separated from each other and only the sensor 17 is directly attached to the steam trap 1 used as the object to be monitored. Further, the transmitter 18 is mounted on the steam piping 30 on the inlet side through a heat insulator 34 such as glass wool. Incidentally, the sensor 17 and the transmitter 18 employed in the present embodiment constitute the sensor unit 2 shown in FIG. 1. The sensor 17 and the transmitter 18 are electrically connected to each other by a cable 35. As is shown by a cross-sectional view in FIG. 4, the sensor 17 is attached and fixed to a nut 36 for assembling the steam trap 1. A nut holder 38 is placed over the nut 36 with a spacer 37 interposed therebetween and coupled to a sensor body 39 by screws, whereby the sensor 17 is fixedly mounted on the nut 36 of the steam trap 1. The spacer 37 and the nut holder 38 form a mounting fixed portion 24.

The sensor body 39 is made up of stainless steel and shaped in the form of a hollow cylinder. The sensor body 39 has a plurality of radiating fins 47 at its upper portion and is connected to the transmitter 18 shown in FIG. 3 through a cap 48 and the cable 35. A vibration transfer bar 40 with a piezoelectric element 41 attached to an upper end of the sensor body 39 is placed within the sensor body 39 while being held by a holding member 42, and a thermocouple 43 is placed at a lower end of the sensor body 39. The vibration transfer bar 40 is shaped in the form of a taper so that the diameter thereof increases from bottom to top. When a lower end of the vibration transfer bar 40 makes contact with an upper end of a bolt 44 paired with the nut 36, vibrations produced in the steam trap 1 are transferred to the piezoelectric element 41 through the bolt 44. The holding member 42 is made of a heat resistant resin and prevents heat generated in the steam trap 1 from being transferred to the piezoelectric element 41. On the other hand, the piezoelectric element 41 is composed of lead niobate or lithium niobate high in heat resistance. A coil spring 45 is placed within the holding member 42 so as to urge the holding member 42 downward. A code 46 is mounted to an upper portion of the piezoelectric element 41 and passes in the cable 35 so as to be connected to the transmitter 18 shown in FIG. 3.

The thermocouple 43 is also connected to the transmitter 18 through a code 49. One, which has heretofore been used so as to be capable of measuring a high temperature of the external surface of the steam trap 1, is used as the thermocouple 43.

The monitoring system for the steam trap 1, which is shown in FIGS. 3 and 4, detects vibrations produced in the steam trap 1 through the use of the piezoelectric element 41 and detects each temperature of the external surface of the steam trap 1 by the thermocouple 43, and transfers it to the transmitter 18 through the cable 35. The detected signal is sent from the transmitter 18 to the portable data logger 3 shown in FIG. 1, whereby the determination or decision as to whether the steam trap 1 normally operates or fails to operate in the normal manner, is made as described above.

Figure 5:
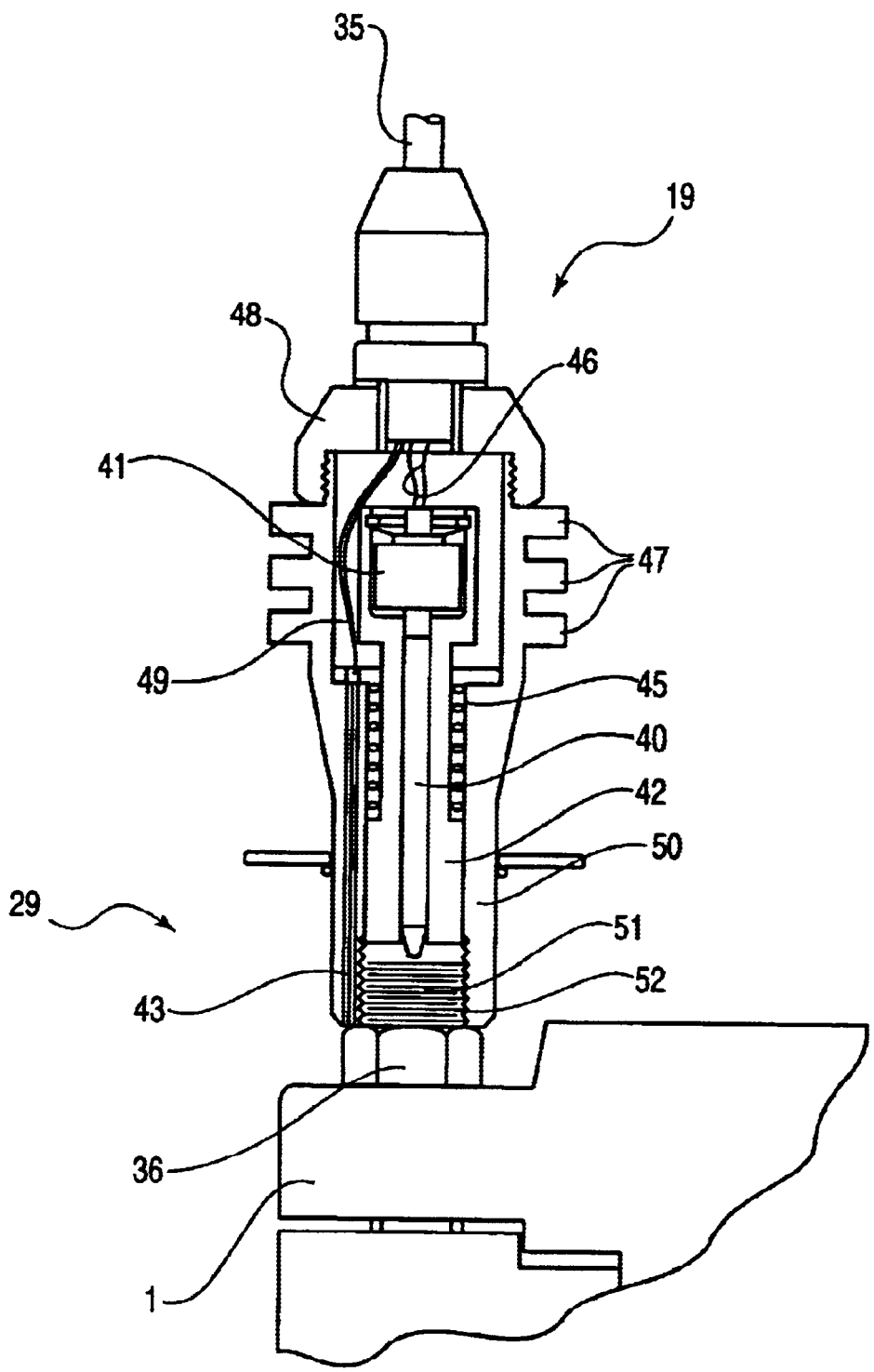
FIG. 5 is a cross-sectional view showing a modification of the sensor shown in FIG. 4.

Next, the sensor 19 shown in FIG. 5 is a sensor in which the mounting fixed portion 24 of the sensor 17 shown in FIG. 4 is partly modified so as to be set as a mounting fixed portion 29. The mounting fixed portion 29 is formed at a lower end of a sensor body 50 by a female screw portion 52 and a bolt 51 paired with a nut 36, and the sensor body 50 is threadedly inserted into an upper portion of the bolt 51, whereby the sensor body 50 is fixed and attached to the steam trap 1.

According to the present invention as described above, a monitoring system can be provided wherein owing to the incorporation of a power supply in at least one of a sensor unit, an arithmetic display unit and a coupling portion, a power supply is incorporated into a point where an electrical wire is maximized in length or becomes complex, to thereby omit wiring, and a power supply is built in a point where a stablest drive source is required, to thereby make it possible to reduce its installation expenses and obtain a predetermined stable result of monitoring.

While the present invention has been described with reference to the illustrative embodiments, this description is not intended to be construed in a limiting sense. Various modifications of the illustrative embodiments, as well as other embodiments of the present invention, will be apparent to those skilled in the art on reference to this description. It is therefore contemplated that the appended claims will cover any such modifications or embodiments as fall within the true scope of the present invention.

What is claimed is:

1. A monitoring system, comprising:
   a sensor unit for sensing at least one physical quantity to be monitored, the at least one physical quantity corresponding to at least one of a temperature, a pressure, a vibration, a sound, a conductance, a concentration, and a pH;
   an arithmetic display unit for performing one of a determining operation and a deciding operation based on the at least one physical quantity sensed by the sensor unit in order to obtain an indication of whether an object to be monitored is functioning according to one of a status corresponding to a normal operation and a status corresponding to a failure in a near future;

a communication module for performing a wireless communication in order to transmit and receive a signal between the sensor unit and the arithmetic display unit;

a coupling portion for coupling the sensor unit and the communication module to each other;

a connection for a driving power supply capable of being arranged in at least one of the sensor unit, the arithmetic display unit, and the coupling portion, wherein:

the object to be monitored corresponds to one of a valve, a steam trap, and equipment with rotary machines in a plant, the object to be monitored including an interior for allowing a fluid to pass therethrough, the sensor unit is mounted with respect to the object to be monitored in accordance with one of a direct mounting on the object to be monitored and a mounting in a vicinity of the object to be monitored, the sensor unit includes a plurality of sensors, the plurality of sensors and the communication module being arranged according to a divided form, the plurality of sensors are directly attached to the object to be monitored, and the communication module is mounted away from the plurality of sensors in a vicinity of the object to be monitored.

2. The monitoring system according to claim 1, wherein the sensor unit includes a limiter for providing a signal when one of an upper limit value and a lower limit value of a value detected by the sensor unit exceeds a predetermined set value.

3. The monitoring system according to claim 1, wherein the sensor unit is directly attached to a fastener including one of a bolt and a nut attached to the object to be monitored.

4. A monitoring system for monitoring at least one object exhibiting a physically measurable characteristic, comprising:

a sensor unit for detecting the at least one object and including:

at least one sensor, a first processing device in communication with the at least one sensor and for producing information based on a detection operation performed by the at least one sensor, a first communication device for transmitting the information produced by the first processing device, and a connection for accepting a power supply; and a data collecting device for collecting the information produced by the first processing device and including:

a second communication device for receiving the information produced by the first processing device, a second processing device, a memory for storing the information produced by the first processing device, and a third communication device for transmitting the information produced by the first processing device to a third processing device, wherein the first communication device draws from the power supply an energy for performing a transmission of the information produced by the first processing device after the first communication device receives an activation command.

5. The monitoring system according to claim 4, wherein:

the first communication device includes a communication module for performing a wireless communication in order to transmit and receive a signal between the sensor unit and the data collecting device, the at least one object corresponds to one of a valve, a steam trap, and equipment with rotary machines in a plant, the at least one object including an interior for allowing a fluid to pass therethrough, the sensor unit is mounted with respect to the at least one object in accordance with one of a direct mounting on the at least one object and a mounting in a vicinity of the at least one object, the at least one sensor includes a plurality of sensors, the plurality of sensors and the communication module being arranged according to a divided form, the plurality of sensors are directly attached to the at least one object, and the communication module is mounted away from the plurality of sensors in a vicinity of the object to be monitored.

6. A monitoring system for monitoring at least one object exhibiting a physically measurable characteristic, comprising:

a sensor unit for detecting the at least one object and including:

at least one sensor, a connection for accepting a power supply, a first processing device in communication with the at least one sensor and for producing information based on a detection operation performed by the at least one sensor, wherein the first processing device includes a timer for measuring a predetermined time period, and a first communication device for transmitting the information produced by the first processing device, wherein the sensor unit is energized when the timer has measured the predetermined time period; and a data collecting device for collecting the information produced by the first processing device and including:

a second communication device for receiving the information produced by the first processing device, a second processing device, a memory for storing the information produced by the first processing device, and a third communication device for transmitting the information produced by the first processing device to a third processing device.

7. The monitoring system according to claim 6, wherein:

the first communication device includes a communication module for performing a wireless communication in order to transmit and receive a signal between the sensor unit and the data collecting device, the at least one object corresponds to one of a valve, a steam trap, and equipment with rotary machines in a plant, the at least one object including an interior for allowing a fluid to pass therethrough, the sensor unit is mounted with respect to the at least one object in accordance with one of a direct mounting on the at least one object and a mounting in a vicinity of the at least one object, the at least one sensor includes a plurality of sensors, the plurality of sensors and the communication module being arranged according to a divided form, the plurality of sensors are directly attached to the at least one object, and the communication module is mounted away from the plurality of sensors in a vicinity of the object to be monitored.

8. A monitoring system for monitoring at least one object exhibiting a physically measurable characteristic, comprising:

a sensor unit for detecting the at least one object and including:
  at least one sensor,
  a first processing device in communication with the at least one sensor and for producing information based on a detection operation performed by the at least one sensor,
  a first communication device for transmitting the information produced by the first processing device, and
  a connection for accepting a power supply;
a data collecting device for collecting the information produced by the first processing device and including:
  a second communication device for receiving the information produced by the first processing device,
  a second processing device,
  a memory for storing the information produced by the first processing device, and
  a third communication device for transmitting the information produced by the first processing device to a third processing device; and
a repeater unit including:
  a fourth communication device, wherein the fourth communication device receives the information produced by the first processing device from the first communication device and transmits the information produced by the first processing device to the second communication device.

9. The monitoring system according to claim 8, wherein:
the first communication device includes a communication module for performing a wireless communication in order to transmit and receive a signal between the sensor unit and the data collecting device,
the at least one object corresponds to one of a valve, a steam trap, and equipment with rotary machines in a plant, the at least one object including an interior for allowing a fluid to pass therethrough,
the sensor unit is mounted with respect to the at least one object in accordance with one of a direct mounting on the at least one object and a mounting in a vicinity of the at least one object,
the at least one sensor includes a plurality of sensors, the plurality of sensors and the communication module being arranged according to a divided form,
the plurality of sensors are directly attached to the at least one object, and
the communication module is mounted away from the plurality of sensors in a vicinity of the object to be monitored.

* * * * *